Dec. 10, 1940. E. O. SCHWEITZER, JR 2,224,320
FAULT INDICATING MEANS
Filed Aug. 11, 1939 4 Sheets-Sheet 1
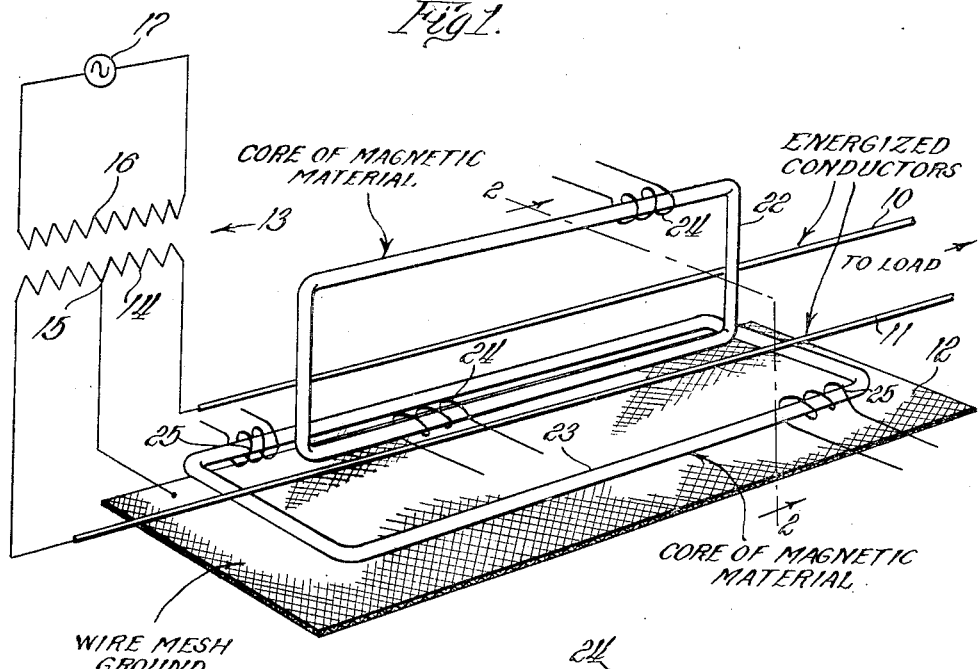
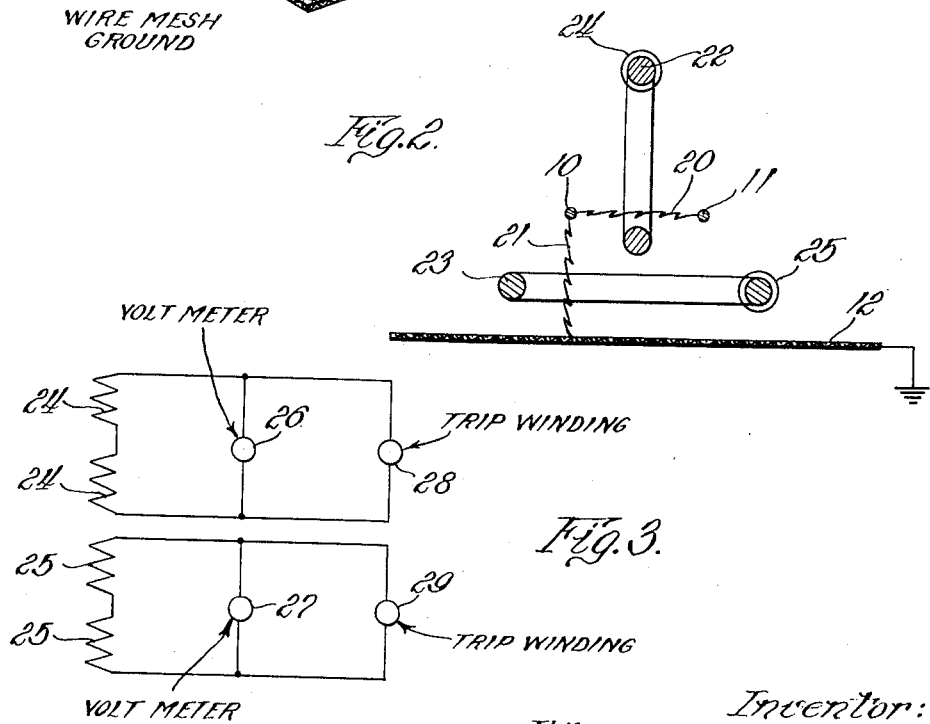
Inventor:
Edmund O. Schweitzer, Jr.

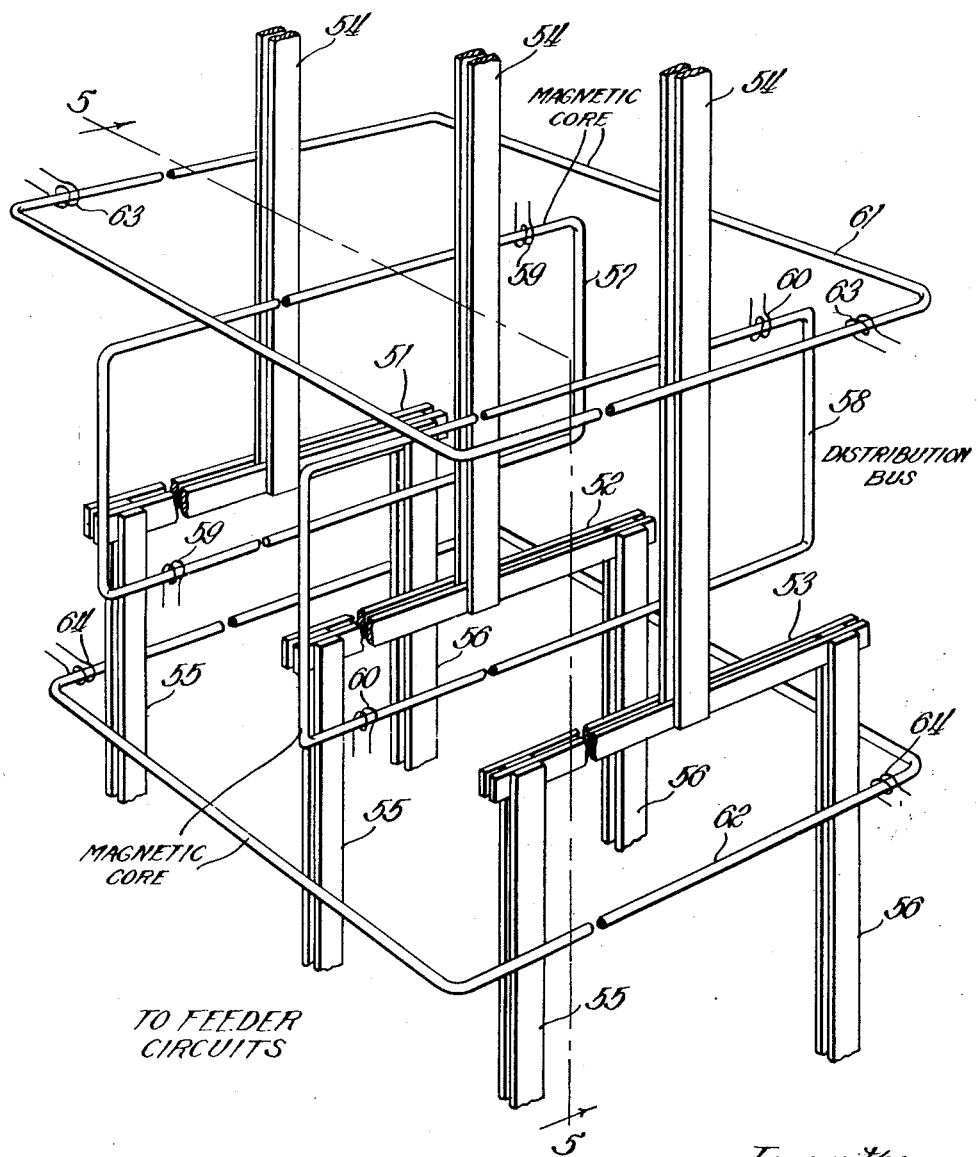

Dec. 10, 1940. E. O. SCHWEITZER, JR 2,224,320
FAULT INDICATING MEANS
Filed Aug. 11, 1939 4 Sheets-Sheet 3
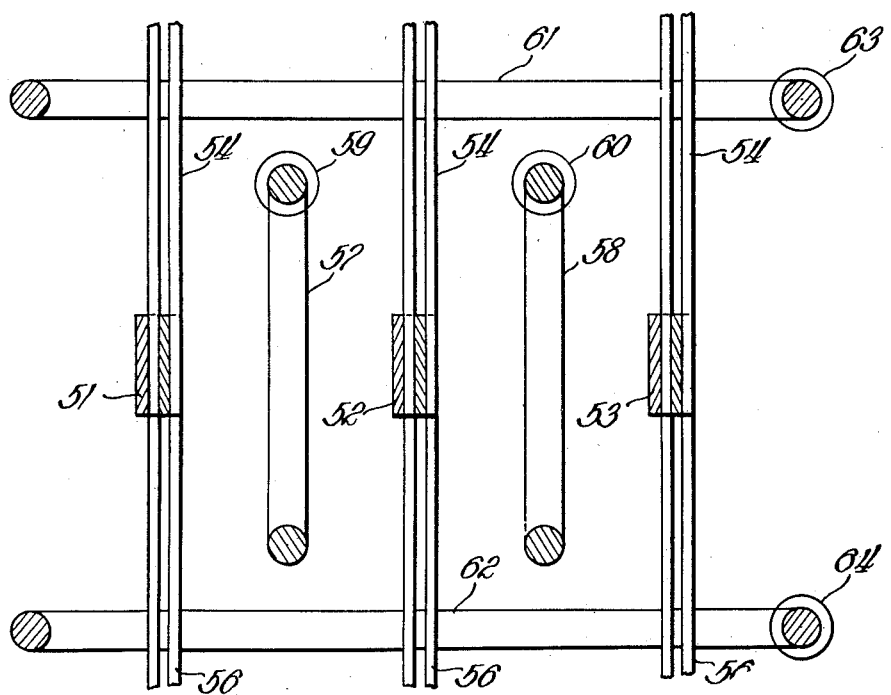
Inventor:
Edmund O. Schweitzer, Jr., Dec. 10, 1940.  E. O. SCHWEITZER, JR  2,224,320
FAULT INDICATING MEANS
Filed Aug. 11, 1939  4 Sheets-Sheet 4

Inventor:
Edmund O. Schweitzer, Jr.,
By
Attys.

Patented Dec. 10, 1940

2,224,320

UNITED STATES PATENT OFFICE 2,224,320

FAULT INDICATING MEANS

Edmund O. Schweitzer, Jr., Northbrook, Ill.

Application August 11, 1939, Serial No. 289,600

6 Claims. (Cl. 175—294)

My invention relates to apparatus for detecting the presence of fault conditions in an electric power distribution system.

In electric power generating stations, its is standard practice to provide a bus to which the generators are connected for distributing power to the various feeder circuits that are connected thereto. In many installations the bus is sectionalized by suitable disconnecting switches and one generator is connected to each section. With the advent of higher and higher generating capacities in each generator, there has been an increasing concentration in the amount of power that is carried by the bus. With this increase in power there has been a corresponding increase in the mechanical stresses to which the bus structure and connections thereto are subjected under normal steady state conditions and under short circuit conditions. The magnetic fields that are set up about the conductors induce various mechanical stresses which require that special precautions be taken in order to maintain the phase conductors in the proper spaced relationship.

Prior to the advent of the higher generating capacities and the concentration of power in larger generating units, it was possible to make certain in most cases that a fault in the bus structure would not occur merely by providing adequate spacing and proper insulation. It has not been possible to correlate the spacing and insulation with the increasing generating capacities and concentration of power and consequently there has been a need for providing adequate protection to buses which operate under present day high power concentrations.

The two fault conditions that must be guarded against in a bus are a phase to phase failure or a phase to ground failure. Usually these faults are caused by an arc being established between phases or between a phase and the ground which, instead of being extinguished, provides an ionized path over which relatively high values of short circuit currents may flow. For example, the normal full load current of the bus may be of the order of 5000 amperes. However, under short circuit conditions, such as described, the current flow may be easily ten times this amount or 50,000 amperes. This is particularly true when it is recalled that there is little impedance in the circuit between the bus and the generator and it is undesirable to provide a substantial amount of impedance there for its presence would increase the losses incident to the normal operation of the unit and decrease the efficiency of the system as a whole. Yet there is the ever present likelihood that such a fault will occur with the consequent destruction of the bus and possible burning out of the generator attached thereto.

Aside from providing adequate spacing between the phases and ground and sufficient insulation, the only steps that apparently have been taken in order to protect the bus from fault conditions are to provide for measuring the current flow into and out of the bus and then to provide for tripping one or more circuit breakers in the event that fault conditions exist in the bus. Of course, it is desirable to distinguish between faults which occur in the bus structure itself and faults which occur externally of it. That is, a fault may occur on one of the feeder circuits which are connected to the bus. In such case the protective apparatus associated with that particular feeder circuit should function to disconnect it from the bus so that the flow of power to the other feeder circuit that may be connected to it will be uninterrupted.

In order to meet these requirements a differential relay protective scheme has been employed. This involves the measuring of the current flow from the generator into the bus and from the bus to the various feeder circuits. Current transformers are provided and they are interconnected with the windings of relays in such manner that under normal operating conditions or when a fault occurs externally of the bus, no relay operation takes place. However, in the event that a fault does occur in the bus, i. e., there is a phase to phase or a phase to ground short circuit, then the balanced normal operating conditions are upset and one or more of the relays functions to disconnect the bus from the generator or from an adjacent bus section so that the fault will be quickly cleared and fault conditions will not spread to other apparatus.

Since the relay system just described depends upon differentiating between normal current flow or fault conditions external to the bus and an internal fault condition, it is necessary to provide a certain amount of time delay in order to properly distinguish between these conditions. Yet, time delay is undesirable for the reason that the amount of damage which results may be materially decreased if the bus is promptly cleared or deenergized.

At best, the differential relay protective scheme is unsatisfactory even if it functions in the intended manner. It will also be obvious that it is difficult to maintain such a system when current transformers are employed since it is an extremely difficult matter to check the accuracy of the current transformers while they are connected to the circuit.

A more serious disadvantage in the use of the differential relay protective scheme resides in the fact that the current transformers which are an essential feature of such a system do not retain the operating characteristics which they had when they were installed. Consider, for example, the occurrence of a short circuit on one of the feeders that is connected to the bus. Such a fault will result in alternating current and direct current transients in the feeder circuit and to a lesser extent in the bus. The magnetic characteristics of the iron in the current transformers connected in the feeder circuit are changed and to a lesser extent the magnetic characteristics of the current transformers in the generator circuit are changed. Thus, the assumed differential operating conditions are upset under the foregoing assumed conditions. In order to take care of this difficulty, the differential operating conditions under which the relay system will function to protect the bus from an internal fault must be so great that relatively great fault current is required to flow before the system is operative. Otherwise, the system is likely to take the bus out of service as a result of switching transients or the occurrence of an external fault.

It will now be apparent that there is no assurance of absolute reliability of a differential relay protective system once it has been installed. This is due principally to the changes in the operating characteristics of the transformers which are provided for obtaining an indication of current flow. About the best that can be done is to provide adequate spacing and insulation between the phases and between the phases and the ground and then to provide a differential relay protective system in which the settings are so high that the effects of changed operating characteristics of the transformers can be ignored. However, this means that there must be considerable time delay between the occurrence of an internal fault in the bus and its disconnection from the generator and also that a relatively large fault current flow in order to initiate the protective system into operation. Both of these factors tend to magnify the damage that is done over that which would result if the bus were disconnected from the generator promptly upon the initial occurrence of an internal fault. It is to a solution of this problem and the provision of a substantially instantaneously operating system for protecting a bus against internal faults that my present invention is addressed.

The object of my invention is to provide a substantially instantaneous indication of the occurrence of an internal fault in an electric power distribution bus.

Another object of my invention is to provide for indicating the occurrence of a fault in a bus entirely independently of the flow of normal load current and independently of the occurrence of an external fault.

Another object of my invention is to employ a magnetic field set up on current flow through an arc for indicating the occurrence of such current flow.

A further object of my invention is to link the magnetic field set up as a result of fault current flow between the phases of an electric power distribution bus and between any of the phases and ground with windings in which the presence of induced voltage indicates that a fault has occurred.

A still further object of my invention is to detect the flow of fault current in a circuit by measuring the fault current exclusively of the normal load current.

Other objects of my invention will, in part, be obvious and, in part, appear hereinafter.

My invention, accordingly, is disclosed in the embodiments thereof shown in the accompanying drawings, and it comprises the features of construction, combination of elements, and arrangement of parts which will be exemplified in the constructions hereinafter set forth, and the scope of the application of which will be indicated in the appended claims.

For a more complete understanding of the nature and scope of my invention, reference may be had to the following detailed description taken in connection with the accompanying drawings, in which:

Figure 1 is a perspective view showing somewhat diagrammatically a single phase embodiment of my invention;

Figure 2 is a detail sectional view taken along the line 2—2 of Figure 1;

Figure 3 illustrates diagrammatically the circuit connections that may be employed in the embodiment of my invention shown in Figure 1;

Figure 4 is a perspective view of a typical electric power distribution bus to which the protective features of the present invention have been applied, the bus conductors and magnetic cores being broken to indicate that they may be of any suitable length;

Figure 5 is a detail sectional view taken along the line 5—5 of Figure 4;

Figure 6:
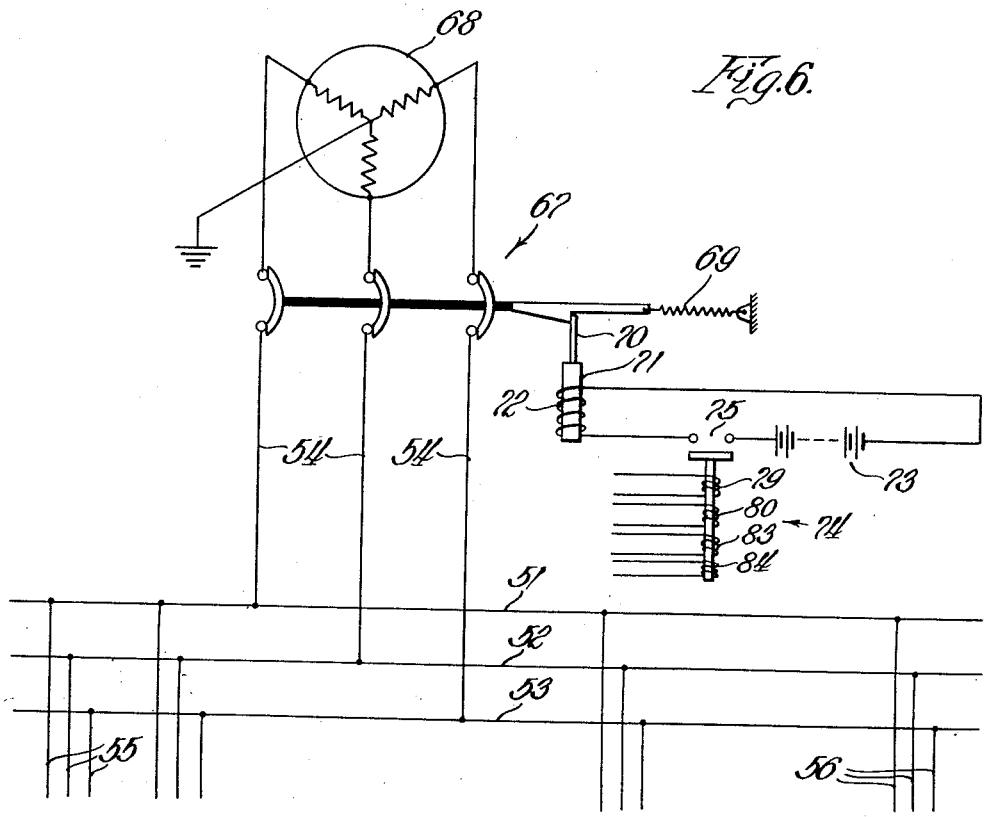
Figure 6 illustrates diagrammatically the circuit connections that may be employed in the bus protective system shown in Figure 4.

Referring now particularly to Figure 1 of the drawings, it will be observed that the reference characters 10 and 11 designate respectively a pair of conductors that are positioned in insulated spaced relation with respect to each other and with respect to ground, which for illustrative purposes, may be formed by a wire mesh 12. The conductors 10 and 11 may be energized with alternating current by a transformer, shown generally at 13, having a secondary winding 14 across which the conductors 10 and 11 are connected and to the center tap 15 of which the wire mesh 12 is connected. The transformer 13 is provided with a primary winding 16 that is connected for energization to a suitable alternating current source 17, such as a 60-cycle source.

While ordinarily an electric power distributing source comprises three conductors or three phases, for illustrative purposes only a single phase circuit comprising two conductors 10 and 11 is shown in Figure 1. As illustrated, the conductors 10 and 11 are energized at the left hand end and they can be considered as being connected to a load at the right hand end. In this particular illustration all of the power from the source flows directly into a single load circuit.

If a fault occurs on the conductors 10 and 11, it is likely to take the form of an arc between these conductors as indicated at 20 in Figure 2 of the drawings. Also, it might take the form of an arc between one of the conductors 10 and the ground mesh 12 as indicated at 21. Instead of an arc, as illustrated, the fault might be in the form of a direct short circuit as would be the case if a conductor were connected between the conductors 10 and 11 or between the conductor 10 and the ground 12. In either case current flows between the conductors 10 and 11 and between the conductor 10 and ground 12 which does not normally flow. This current flow, either along an arc path or along a conductor is accompanied by magnetic flux which flux is not present except under these abnormal conditions. By providing means which is responsive to the presence of this abnormal flux, it is possible to obtain an indication of the appearance of the abnormal condition and to utilize this indication as the circumstances may dictate to clear the fault.

In effect, when the circuit is completed as indicated at 20 and 21, it can be considered that a single turn primary circuit for a transformer has been completed. Then it remains only necessary to provide a core and a secondary winding in which a voltage can be induced on the occurrence of the fault. Therefore, I have provided two magnetic cores 22 and 23, the core 22 being positioned between the conductors 10 and 11 and the core 23 being positioned between these conductors and ground 12. The secondary winding in each case is provided by the windings 24 on the core 22 and the windings 25 on the core 23. Two windings are provided in each case near the ends of the cores 22 and 23 in order to link the maximum number of flux lines under substantially all fault conditions.

As shown in Figure 3 of the drawings, the windings 24 and 25 may be connected respectively in series circuit relation and across volt meters 26 and 27, which by movement of their respective indicators will denote the presence of a fault either between the conductors 10 and 11 or between these conductors and ground 12.

As will hereinafter appear the voltage that is induced in the windings may be employed to initiate a sequence of operations which result in tripping open a switch which interconnects the conductors or electric power distribution bus with the source of alternating current. Therefore, for illustrative purposes trip windings 28 and 29 are shown as being connected across the series connected pairs of windings 24 and 25.

Under normal operating conditions since the magnetic core 22 is positioned between the conductors 10 and 11 no magnetomotive force will be applied which would cause magnetic flux to flow therein. Thus whether conductors 10 and 11 are energized but no current flows or if current does flow to a load no voltage will be induced in the windings 24. More specifically, if the conductors 10 and 11 are short circuited outside of the core 22, no voltage will be induced in the windings 24 for the reason that the magnetomotive forces applied to the core 22 remain balanced. As much current flows in the conductor 10 as flows in the conductor 11 and in opposite directions. However, as soon as the conductors 10 and 11 are short circuited within the magnetic core 22, either by an arc 20 or by a conductor, then the balance is upset and magnetomotive force is applied to cause flux to flow in the magnetic core 22, resulting in the induction of voltages in the windings 24. As previously indicated, such a condition results in the completion of the primary winding of a transformer having a single turn, the secondary winding being provided by the windings 24 and the core, of course, being provided by the magnetic core 22.

Since voltages are induced in the windings 24 only upon the occurrence of a fault in which current flows between the conductors 10 and 11 within the magnetic core 22, it is then unnecessary to provide for distinguishing between normal current flow in the conductors 10 and 11 and abnormal or short circuit current flow. Moreover, the occurrence of a fault external to the magnetic core 22 has no effect on the magnetic properties of this core and consequently its operation characteristics are unchanged regardless of external fault conditions. It is unnecessary to provide a time delay between the occurrence of a fault within the magnetic core 22 and a subsequent operation in response thereto in order to distinguish between normal and abnormal operating conditions.

Referring now particularly to Figures 4 and 5 of the drawings it will be observed that a typical electric power distribution bus comprising phase conductors 51, 52, and 53 is illustrated. The bus is energized from a suitable 3-phase alternating current source by means of conductors 54. A number of load circuits, as illustrated by the conductors 55 and 56 may be connected to the bus conductors 51, 52, and 53. It will be understood that as many feeder circuits as desired may be employed while only a single set of supply conductors 54 has been shown and a single set of feeder circuits 55 and 56. It will be understood that, in a modern power station, there will be a number of supply circuits and a number of sets of feeder circuits, all connected to distribution buses which may be permanently connected together or may be connected together through impedance devices or through disconnecting switches or circuit breakers. However, for illustrative purposes it is only necessary to show herein the apparatus which is individual to a single unit.

With a view to providing an indication of a fault between the phase conductors 51, 52, and 53 of the bus, magnetic cores 57 and 58 are provided between them. Windings 59 and 60 are provided on the cores 57 and 58, respectively, in which voltages are induced on the occurrence of a fault between the phase conductors as will now be readily understood.

Likewise, in order to indicate the occurrence of a ground fault, either above or below the bus conductors 51, 52, and 53, magnetic cores 61 and 62 are provided, as shown. Windings 63 and 64 are provided on the cores 61 and 62, respectively, in which voltages are induced in the event that there is flow of fault current to ground through either of the magnetic cores 61 or 62.

Figure 7:
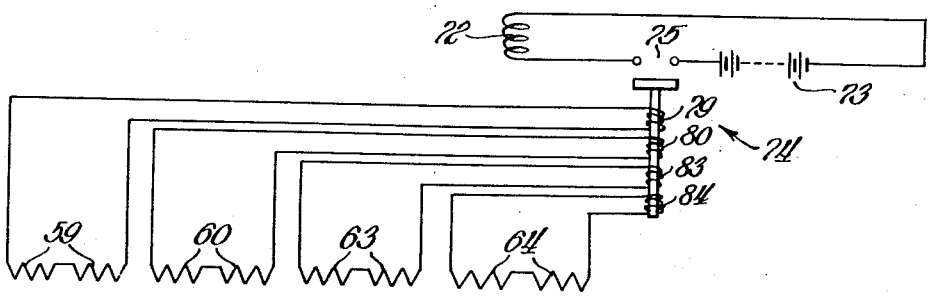
Figure 7 illustrates diagrammatically additional details of the control circuits for the system shown in Figure 4.

In Figures 6 and 7 of the drawings, the circuit connections for the bus structure illustrated in Figures 4 and 5 of the drawings are shown in detail. A circuit breaker, shown generally at 67, is provided for connecting the supply conductors 54 to a 3-phase, star connected, grounded neutral generator 68. Any suitable mechanism may be provided for closing the circuit breaker 67. A spring 69 is shown as biasing the circuit breaker 67 to the open position but it is restrained in the closed position by a latch 70 which is mounted on and is movable with an armature 71. A solenoid 72, when energized, attracts the armature 71 and releases the circuit breaker 67 for movement under the influence of the spring 69 to the open circuit position. It is desirable that the solenoid 72 be energized on the induction of voltage in any one of the pairs of windings 59, 60, 63 or 64, as will be readily understood. For this purpose a suitable source such as a battery 73 is provided which can be connected by means of a relay, shown generally at 74, having contact members 75 which are bridged on energization of any one of operating windings 79, 80, 83, or 84.

As shown in Figure 7 of the drawings, the operating windings 79, 80, 83, and 84 are connected respectively across pairs of windings 59, 60, 63, and 64 so that on the induction of voltage in any winding or pair of windings, one of the operating windings on the relay 74 will be energized and the circuit will be completed by contact members 75 for energizing the solenoid 72 to trip the circuit breaker 67.

Since certain further changes can be made in the above constructions and different embodiments of the invention can be made without departing from the scope thereof, it is intended that all matter contained in the foregoing description or shown in the accompanying drawings shall be interpreted as illustrative and not in a limiting sense.

I claim as my invention:

1. In an electric power distribution system, in combination, a pair of spaced apart conductors adapted to be connected to a source of electric current and normally insulated from each other but likely to have an arc formed therebetween, means responsive to the magnetic field surrounding and generated by current flow through said arc, and means operated by said magnetic field responsive means.

2. In an electric power distribution system, in combination, a pair of spaced apart conductors adapted to be connected to a source of electric current and normally insulated from each other but likely to have an arc formed therebetween, magnetic circuit means adapted to link said arc, winding means linking said magnetic circuit means in which a voltage is generated as a result of the induction of flux in said magnetic circuit means by current flow through said arc, and means connected to said winding means responsive to said voltage.

3. In an electric power distribution system, in combination, a conductor normally insulated from ground and adapted to be connected to a source of alternating current but likely to have an arc formed between it and ground, means responsive to the magnetic field surrounding and generated by current flow through said arc, and means operated by said magnetic field responsive means.

4. In an electric power distribution system, in combination, a conductor normally insulated from ground and adapted to be connected to a source of alternating current but likely to have an arc formed between it and ground, magnetic circuit means adapted to link said arc, winding means linking said magnetic circuit means in which a voltage is generated as a result of the induction of flux in said magnetic circuit means by current flow through said arc, and means connected to said winding means responsive to said voltage.

5. In an electric power distribution system, in combination; a pair of conductors spaced from each other and from ground, adapted to be connected to a source of alternating current, and normally insulated from each other and from ground but likely to have an arc formed between them or between either of them and ground, a circuit of magnetic material between said conductors and around the path of an arc likely to be formed therebetween, another circuit of magnetic material between both of said conductors and ground and around the path of an arc likely to be formed therebetween, winding means linking said circuits of magnetic material in which a voltage or voltages are generated as a result of induction of flux in said circuits of magnetic material by current flow through one or more of said arcs, and means connected to said winding means responsive to one or more of said voltages.

6. In an electric power station bus construction, in combination; three bus conductors spaced from each other and from ground, adapted to be connected to a three phase grounded neutral source of alternating current and normally insulated from each other and from ground but likely to have an arc formed between adjacent pairs or between any of them and ground; magnetic circuit means between each pair of said conductors and around the paths of any arcs likely to be formed therebetween, magnetic circuit means between said bus conductors and ground and around the paths of any arcs likely to be formed therebetween, winding means linking said magnetic circuit means in which a voltage or voltages are generated as a result of induction of flux in said magnetic circuit means by current flow through one or more of said arcs, and means connected to said winding means responsive to one or more of said voltages.

EDMUND O. SCHWEITZER, Jr.